(12) United States Patent
Kimura et al.

(10) Patent No.: US 9,948,405 B1
(45) Date of Patent: Apr. 17, 2018

(54) UNDERWATER MOBILE BODY

(71) Applicant: FUJI XEROX CO., LTD., Tokyo (JP)

(72) Inventors: Tsutomu Kimura, Kanagawa (JP);
Motofumi Baba, Kanagawa (JP);
Masahiro Sato, Kanagawa (JP);
Yoshihiko Nemoto, Kanagawa (JP);
Akihito Yamauchi, Kanagawa (JP);
Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/498,936

(22) Filed: Apr. 27, 2017

(30) Foreign Application Priority Data

Oct. 6, 2016 (JP) .................................. 2016-198244

(51) Int. Cl.
*H04B 13/02* (2006.01)

(52) U.S. Cl.
CPC .................................... *H04B 13/02* (2013.01)

(58) Field of Classification Search
CPC ..................................................... H04B 13/02
USPC .......................................................... 455/40
See application file for complete search history.

(56) References Cited

U.S. PATENT DOCUMENTS

| | | | | |
|---|---|---|---|---|
| 3,665,884 A | * | 5/1972 | Gustafson | B63G 8/22 114/333 |
| 3,675,607 A | * | 7/1972 | Dorschel | B63C 11/36 114/314 |
| 3,842,770 A | * | 10/1974 | Hedbawny | B63G 7/04 102/402 |
| 4,156,136 A | * | 5/1979 | Strum | H01J 40/14 250/215 |
| 4,200,922 A | * | 4/1980 | Hagemann | B63G 7/02 367/106 |
| 4,599,965 A | * | 7/1986 | Johnson | B63C 11/26 116/173 |
| 4,779,554 A | * | 10/1988 | Courtney | B63C 9/1255 114/315 |
| 4,873,676 A | * | 10/1989 | Bailey | G01S 7/529 181/124 |
| 4,954,999 A | * | 9/1990 | Teel | G01S 7/527 367/97 |
| 4,980,868 A | * | 12/1990 | Teel | G01S 7/526 367/904 |
| 5,022,790 A | * | 6/1991 | Stevenson | B63C 11/26 116/142 FP |
| 5,379,267 A | * | 1/1995 | Sparks | B63B 22/18 367/18 |
| 5,516,233 A | * | 5/1996 | Courtney | B63C 9/1255 405/186 |

(Continued)

FOREIGN PATENT DOCUMENTS

JP     2015-177395 A     10/2015

*Primary Examiner* — Hai V Nguyen
(74) *Attorney, Agent, or Firm* — Sughrue Mion, PLLC

(57) ABSTRACT

An underwater mobile body includes: a communication unit that has a plurality of communicators adopting different communication systems and that performs underwater wireless communication with another device using one of the plurality of communicators; an acquisition unit that acquires information on depth or information varying with depth; and a control unit that controls the communication unit to switch, between the plurality of communicators and based on the acquired information, the one communicator used for underwater wireless communication.

7 Claims, 16 Drawing Sheets

(56) References Cited

U.S. PATENT DOCUMENTS

| | | | | |
|---|---|---|---|---|
| 5,737,246 A * | 4/1998 | Furukawa | G04G 21/02 | 702/166 |
| 5,802,012 A * | 9/1998 | Yamaguchi | G01S 15/8904 | 367/88 |
| 5,805,528 A * | 9/1998 | Hamada | G01S 7/6227 | 367/111 |
| 5,855,454 A * | 1/1999 | Courtney | B63C 9/1055 | 405/186 |
| 6,203,246 B1 * | 3/2001 | Courtney | B63C 9/1255 | 405/185 |
| 6,273,771 B1 * | 8/2001 | Buckley | B63H 21/213 | 114/144 RE |
| 6,360,182 B1 * | 3/2002 | Hales | A62B 18/08 | 128/201.27 |
| 6,527,479 B1 * | 3/2003 | Courtney | B63C 9/1255 | 405/185 |
| 6,527,480 B2 * | 3/2003 | Angelini | B63C 11/30 | 405/186 |
| 6,558,082 B1 * | 5/2003 | Courtney | B63C 9/1055 | 116/26 |
| 6,666,622 B1 * | 12/2003 | Courtney | B63C 9/08 | 405/186 |
| 6,856,578 B2 * | 2/2005 | Magine | B63C 11/26 | 367/134 |
| 6,999,857 B1 * | 2/2006 | Kasper | H04B 17/327 | 340/850 |
| 7,433,772 B2 * | 10/2008 | Isaji | B60T 7/22 | 340/435 |
| 7,612,686 B1 * | 11/2009 | Bustamante | H04B 13/02 | 340/425.1 |
| 7,627,446 B2 * | 12/2009 | Hirose | B63C 11/02 | 702/139 |
| 7,826,794 B2 * | 11/2010 | Rhodes | H04B 13/02 | 340/850 |
| RE42,218 E * | 3/2011 | Magine | B63C 11/26 | 367/134 |
| 8,059,485 B2 * | 11/2011 | Sato | B63G 8/39 | 367/134 |
| 8,180,595 B2 * | 5/2012 | Daniels | G01D 11/24 | 702/127 |
| 8,207,901 B2 * | 6/2012 | Joe | H04B 13/02 | 343/709 |
| 8,304,935 B2 * | 11/2012 | Karalis | H02J 5/005 | 307/104 |
| 8,315,560 B2 * | 11/2012 | Rhodes | H04B 13/02 | 340/572.7 |
| 8,325,056 B2 * | 12/2012 | Volanthen | H04B 13/02 | 324/239 |
| 8,350,653 B2 * | 1/2013 | Rhodes | H01F 38/14 | 336/115 |
| 8,590,476 B2 * | 11/2013 | Goudeau | B63B 27/36 | 114/322 |
| 8,604,986 B2 * | 12/2013 | Lucas | H04B 13/02 | 343/709 |
| 8,880,275 B1 * | 11/2014 | Del Savio | G05D 1/0022 | 114/312 |
| 9,090,319 B2 * | 7/2015 | Brizard | B63C 11/42 | |
| 9,164,506 B1 * | 10/2015 | Zang | G05D 1/0038 | |
| 9,269,254 B2 * | 2/2016 | Baumgartinger | B63C 9/20 | |
| 9,335,764 B2 * | 5/2016 | Herz | G05D 1/0038 | |
| 9,440,718 B1 * | 9/2016 | Tang | B63G 8/001 | |
| 9,577,462 B2 * | 2/2017 | Maekawa | B63G 8/001 | |
| 9,608,738 B2 * | 3/2017 | Riedl | G01P 3/44 | |
| 9,662,674 B2 * | 5/2017 | Ayer | B05B 17/08 | |
| 9,663,200 B2 * | 5/2017 | Napolitano | G01C 21/16 | |
| 9,718,523 B2 * | 8/2017 | Tan | B63G 8/001 | |
| 9,821,894 B2 * | 11/2017 | Brizard | B63G 8/001 | |
| 2003/0075096 A1 * | 4/2003 | Leonard | B63G 8/24 | 114/331 |
| 2003/0115010 A1 * | 6/2003 | Estep | B63C 11/12 | 702/127 |
| 2004/0022129 A1 * | 2/2004 | McGeever, Jr. | B63C 11/26 | 367/128 |
| 2004/0157514 A1 * | 8/2004 | Courtney | B63C 9/081 | 441/88 |
| 2005/0159275 A1 * | 7/2005 | Bullman | A63B 69/0035 | 482/111 |
| 2005/0262221 A1 * | 11/2005 | Daniels | G01D 9/005 | 709/219 |
| 2006/0194537 A1 * | 8/2006 | McCoy | H04B 13/02 | 455/40 |
| 2006/0239122 A1 * | 10/2006 | Vigen | G01V 1/303 | 367/131 |
| 2007/0021945 A1 * | 1/2007 | Riskey | A01K 11/008 | 702/188 |
| 2007/0076527 A1 * | 4/2007 | Romano | H04B 11/00 | 367/134 |
| 2007/0162254 A1 * | 7/2007 | Hirose | B63C 11/02 | 702/166 |
| 2009/0316522 A1 * | 12/2009 | Sato | B63G 8/39 | 367/5 |
| 2010/0007214 A1 * | 1/2010 | Howard | B60L 11/182 | 307/104 |
| 2010/0183373 A1 * | 7/2010 | Stood | B63C 11/2245 | 405/186 |
| 2011/0009053 A1 * | 1/2011 | Anglin, Jr. | H04B 7/2606 | 455/9 |
| 2011/0043047 A1 * | 2/2011 | Karalis | H02J 5/005 | 307/104 |
| 2011/0163926 A1 * | 7/2011 | Lucas | H04B 13/02 | 343/719 |
| 2011/0192338 A1 * | 8/2011 | Goudeau | B63B 27/36 | 114/322 |
| 2012/0213034 A1 * | 8/2012 | Imran | H04B 11/00 | 367/132 |
| 2013/0083624 A1 * | 4/2013 | Brizard | B63C 11/42 | 367/15 |
| 2013/0206915 A1 * | 8/2013 | Desaulniers | B64C 39/024 | 244/165 |
| 2013/0321223 A1 * | 12/2013 | Bokenfohr | H04B 13/02 | 343/719 |
| 2013/0329520 A1 * | 12/2013 | van Borselen | G01V 1/28 | 367/24 |
| 2014/0071793 A1 * | 3/2014 | Riedl | G01P 3/44 | 367/137 |
| 2014/0232200 A1 * | 8/2014 | Maekawa | B63G 8/001 | 307/104 |
| 2014/0241122 A1 * | 8/2014 | Ponceau | G01V 1/38 | 367/18 |
| 2015/0070173 A1 * | 3/2015 | Baumgartinger | B63C 9/20 | 340/573.1 |
| 2015/0120045 A1 * | 4/2015 | Tan | B63G 8/001 | 700/250 |
| 2015/0183498 A1 * | 7/2015 | Wardle | B63G 8/38 | 114/337 |
| 2015/0336646 A1 * | 11/2015 | Brizard | B63C 11/42 | 114/338 |
| 2015/0346722 A1 * | 12/2015 | Herz | G05D 1/0038 | 701/2 |
| 2016/0030967 A1 * | 2/2016 | Ayer | B05B 17/08 | 239/1 |
| 2016/0040968 A1 * | 2/2016 | Jeng | F42B 19/01 | 114/312 |
| 2016/0050030 A1 * | 2/2016 | Riedl | H04B 11/00 | 367/133 |
| 2016/0114887 A1 * | 4/2016 | Zhou | B60F 5/02 | 348/148 |
| 2016/0121009 A1 * | 5/2016 | Farr | H04B 13/02 | 250/492.1 |
| 2016/0127042 A1 * | 5/2016 | Farr | H04B 10/2581 | 398/104 |
| 2016/0167750 A1 * | 6/2016 | Napolitano | G01C 21/16 | 701/454 |
| 2016/0167755 A1 * | 6/2016 | Soofi | B63G 8/001 | 701/21 |
| 2016/0201423 A1 * | 7/2016 | Biester | E21B 33/0355 | 251/1.1 |

(56) References Cited

U.S. PATENT DOCUMENTS

| | | | |
|---|---|---|---|
| 2016/0245649 A1* | 8/2016 | Laster | G01C 13/00 |
| 2016/0286128 A1* | 9/2016 | Zhou | H04N 5/23248 |
| 2017/0300051 A1* | 10/2017 | Zhou | G05D 1/0038 |

* cited by examiner

UNDERWATER MOBILE BODY

CROSS-REFERENCE TO RELATED APPLICATIONS

This application is based on and claims priority under 35 USC 119 from Japanese Patent Application No. 2016-198244 filed Oct. 6, 2016.

BACKGROUND

Technical Field

The present invention relates to an underwater mobile body.

SUMMARY

According to an aspect of the invention, there is provided an underwater mobile body including: a communication unit that has multiple communicators adopting different communication systems and that performs underwater wireless communication with another device using one of the multiple communicators; an acquisition unit that acquires information on depth or information varying with depth; and a control unit that controls the communication unit to switch, between the plurality of communicators and based on the acquired information, the one communicator used for underwater wireless communication.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the present invention will be described in detail with reference to the accompanying drawings.

First Exemplary Embodiment

<Configuration of Underwater Drone>

Figure 1:
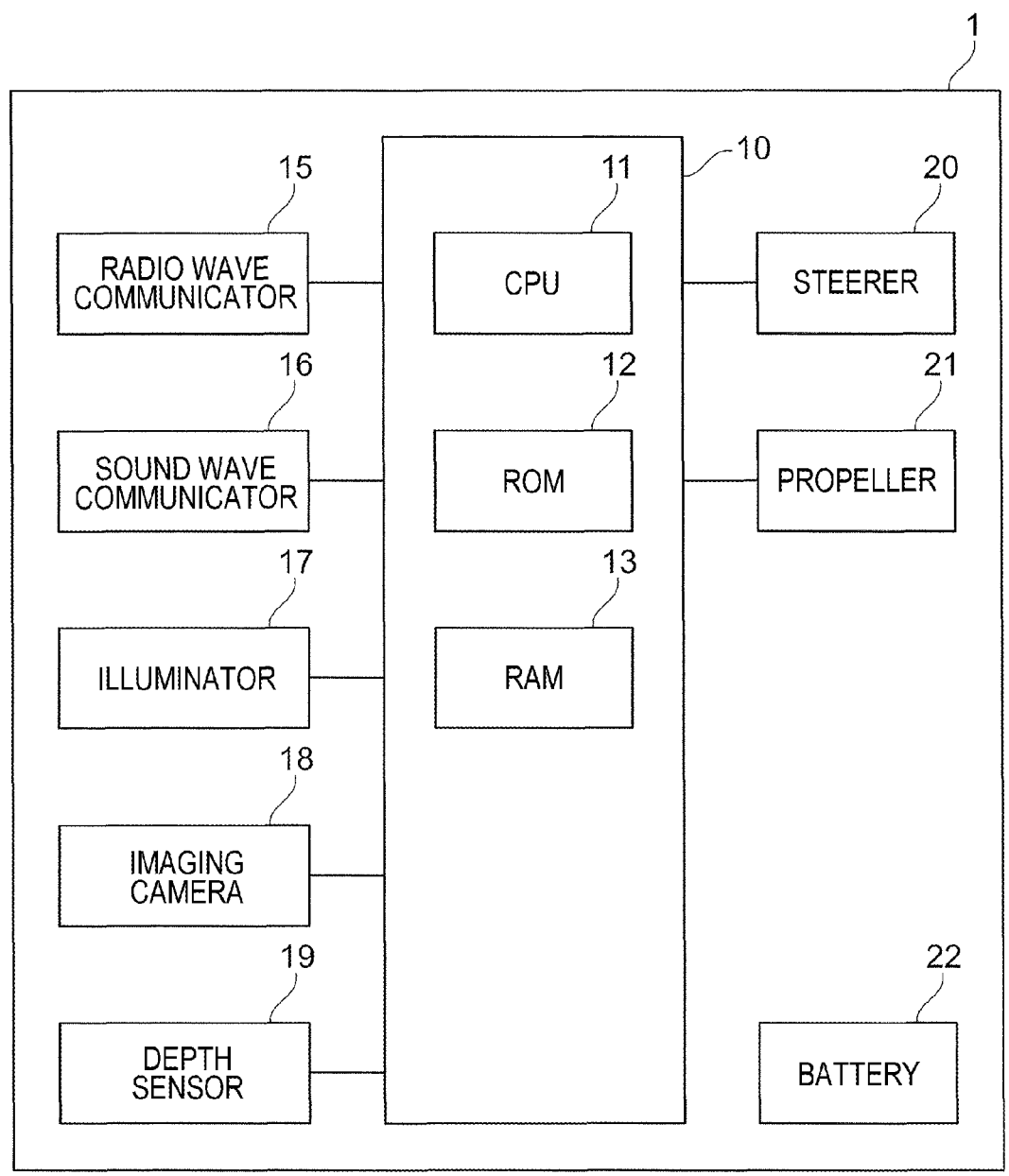
FIG. 1 is a diagram illustrating a configuration example of an underwater drone according to a first exemplary embodiment.

FIG. 1 is a diagram illustrating a configuration example of an underwater drone 1 according to a first exemplary embodiment. The underwater drone 1 is an example of an underwater mobile body, and more specifically, is a type of unmanned underwater mobile body. The underwater drone is classified into an autonomous navigation type and a remote-control type. In this exemplary embodiment, the underwater drone is assumed to be remote-control type. However, the details of the control described later may be applied to an autonomous navigation underwater drone.

In the underwater drone 1 according to this exemplary embodiment, functional units are connected to a controller 10 which is as an example of a control unit. The functional units including the controller 10 are basically housed in a housing which adopts a waterproof structure. Power is supplied from a battery 22 to the functional units including the controller 10. The battery 22 is an example of a power source, and uses, for instance, a primary battery, a secondary battery and/or a fuel cell. It is to be noted that an internal combustion engine may be used as the power source.

The controller 10 controls the units that configurate the underwater drone 1. The controller 10 is configurated by a central processing unit (CPU) 11, a read only memory (ROM) 12, and a random access memory (RAM) 13. The ROM 12 stores programs to be executed by the CPU 11. The CPU 11 reads a program stored in the ROM 12, and executes the program using the RAM 13 as a work area. The CPU 11 controls the functional units that configurate the underwater drone 1, by the execution of the program.

The underwater drone 1 is equipped with multiple communicators adopting different communication systems. In the case of this exemplary embodiment, the underwater drone 1 is equipped with two types of communicator: a radio wave communicator 15 and a sound wave communicator 16. The radio wave communicator 15 is a communicator that transmits and receives radio waves, and the sound wave communicator 16 is a communicator that transmits and receives sound waves. The radio wave communicator 15 and the sound wave communicator 16 are examples of a communicator that configurates the communication unit.

The radio wave communicator 15 in this exemplary embodiment uses radio waves with a wavelength of 10 to 100 km, called very low frequency radio waves for communication. In this case, the transmission distance underwater is 10 m. It is to be noted that when radio waves with a wavelength of 100 to 1,000 km, called extremely low frequency radio waves is used for communication, the transmission distance underwater is 100 m. However, the transmission distance varies depending on whether communication is performed in fresh water or sea water, and is affected by the presence of wave on the surface of water, the presence of turbidity and a water temperature.

The sound wave communicator 16 in this exemplary embodiment uses sound waves for communication. In general, the transmission distance underwater of sound waves is several 100 to several 1,000 m, and may reach 10,000 m. In the case of this exemplary embodiment, the radio wave communicator 15 is selected for shallow water area, and the sound wave communicator 16 is selected for a deep water area.

An illuminator 17 is provided to illuminate an operating range. As the illuminator 17, for instance, a halogen lamp, a white light emitting diode (LED) or a color LED is used. An imaging camera 18 is provided to capture an image of the operating range. The imaging camera 18 may be a camera that captures a still image or a camera that captures a dynamic image. A captured image is stored in the RAM 13, for instance.

A depth sensor 19 detects a depth utilizing a water pressure. The depth sensor 19 converts a detected water pressure to a depth, and outputs the depth to the controller 10. The accuracy of measurement of and resolution of the depth depend on the depth sensor 19.

A steerer 20 is used to change the direction of movement. The direction of movement is controlled by remote control or a program executed by the controller 10. The direction of movement includes not only a direction in a horizontal plane, but also a vertical direction (a surfacing direction and a descending direction). A propeller 21 is configurated by, for instance, a propeller and a motor that rotates the propeller. The motor has a watertight structure to protect the inside from rusting.

<Functional Configuration of Controller>

Figure 2:
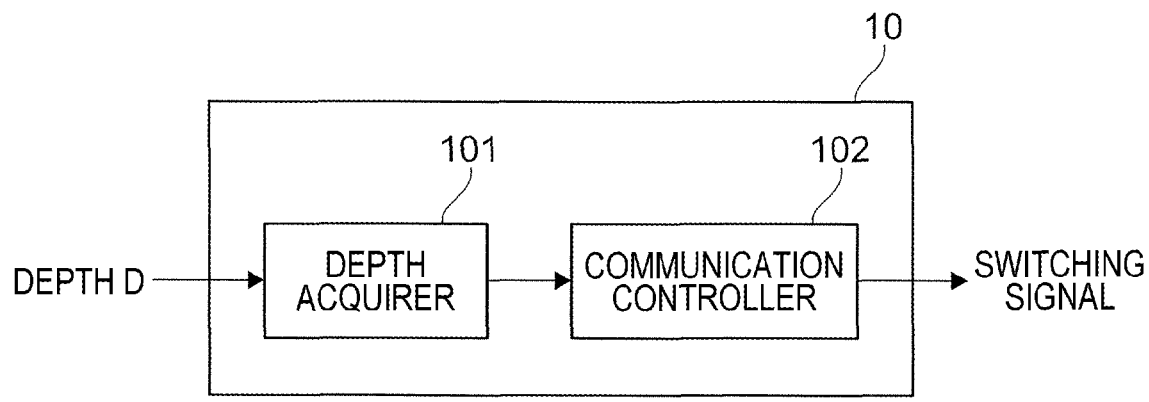
FIG. 2 is a block diagram illustrating an example of a functional configuration of a controller according to the first exemplary embodiment.

Next, the functional configuration of the controller 10 will be described. FIG. 2 is a block diagram illustrating an example of the functional configuration of the controller 10 according to the first exemplary embodiment. The controller 10 has a depth acquirer 101 and a communication controller 102. The depth acquirer 101 is an example of the acquisition unit, and the communication controller 102 is an example of the control unit.

The depth acquirer 101 acquires a depth D from the depth sensor 19, and stores the depth D, for instance, in the RAM 13. The communication controller 102 compares the acquired depth D with a threshold Th_D, and determines a communication system (specifically communicator) to be used for underwater wireless communication. In the case of this exemplary embodiment, the threshold Th_D is set to 10 m. The value of the threshold Th_D depends on the wavelength and application of radio waves to be used.

Figure 3:
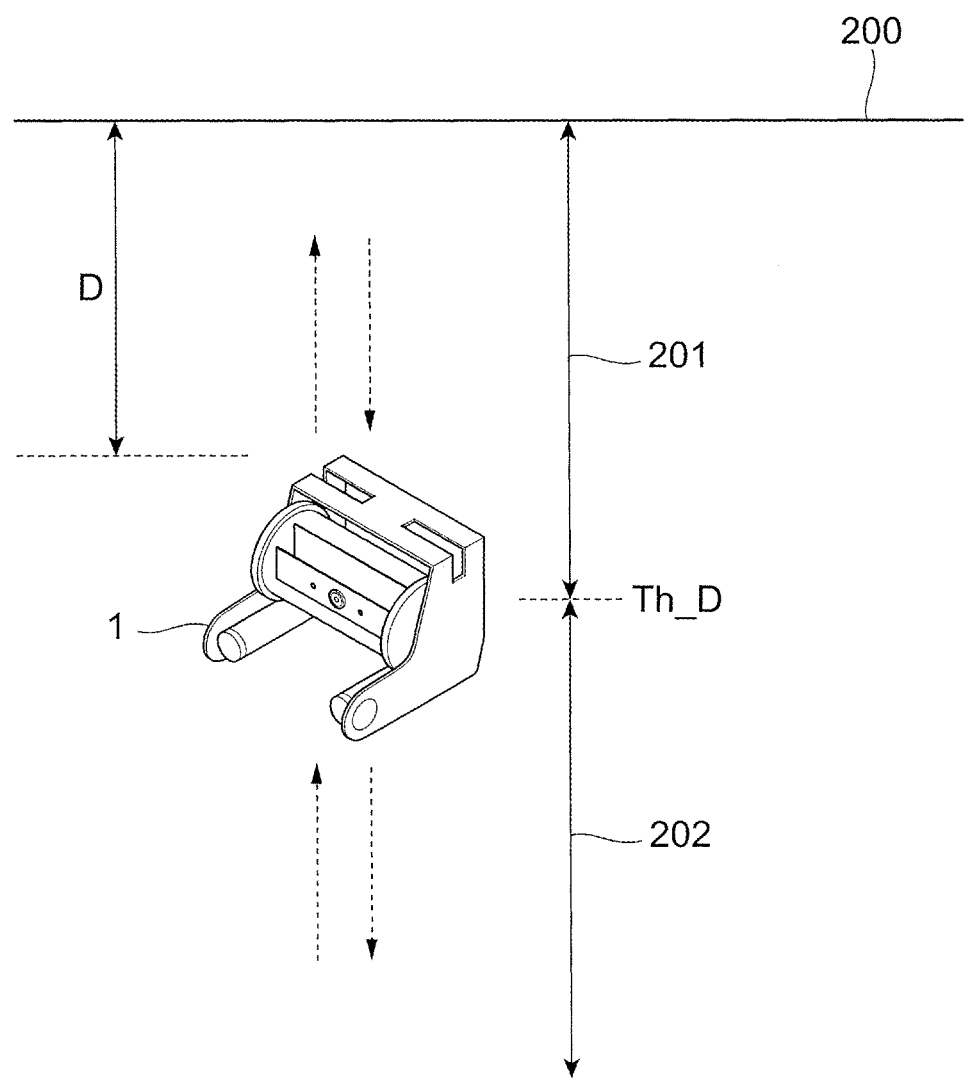
FIG. 3 is an illustration conceptually explaining switching between communication systems performed by a communication controller according to the first exemplary embodiment.

FIG. 3 is an illustration conceptually explaining switching between communication systems performed by the communication controller 102 according to the first exemplary embodiment. The depth D here is the distance from a water surface 200 to the underwater drone 1, and is given as a value measured by the depth sensor 19.

The communication controller 102 compares the measured value of the depth D with the threshold Th_D, and determines a communication system to be used according to a result of the comparison. In the case of this exemplary embodiment, the communication controller 102 uses a water depth area shallower than the threshold Th_D as a radio wave communication area 201, and uses a water depth area deeper than the threshold Th_D as a sound wave communication area 202. This is because radio waves have a shorter underwater transmission distance and a higher transmission speed compared with sound waves.

Use of radio waves with a relatively high transmission speed increases the responsiveness of the underwater drone 1 to a user operation. Therefore, in a shallow water area (radio wave communication area 201), the operability of a user is improved compared with the case where only sound waves are used for underwater wireless communication. In addition, the use of radio waves is also advantageous for achieving real-time transmission of image data captured by the imaging camera 18 because of the high transmission speed.

In contrast, in an area where it is difficult for radio waves to reach or an area where radio waves do not reach (sound wave communication area 202) due to the large depth of water, remote control of the underwater drone 1 is continued by using sound waves. Although the transmission speed of sound waves is lower than the transmission speed of radio waves, remote control is also continued due to a longer transmission distance of sound waves. It is to be noted that the current image format may be switched to an image format having a higher compression rate at a timing when the communication system is switched to the sound wave system.

The communication controller 102 outputs a switching signal when detecting satisfaction of switching conditions. Specifically, the communication controller 102 outputs a signal to switch the communicator used for communication from the radio wave communicator 15 to the sound wave communicator 16, or a signal to switch the communicator used for communication from the sound wave communicator 16 to the radio wave communicator 15.

<Processing Steps Executed by Underwater Drone 1>

Figure 4:
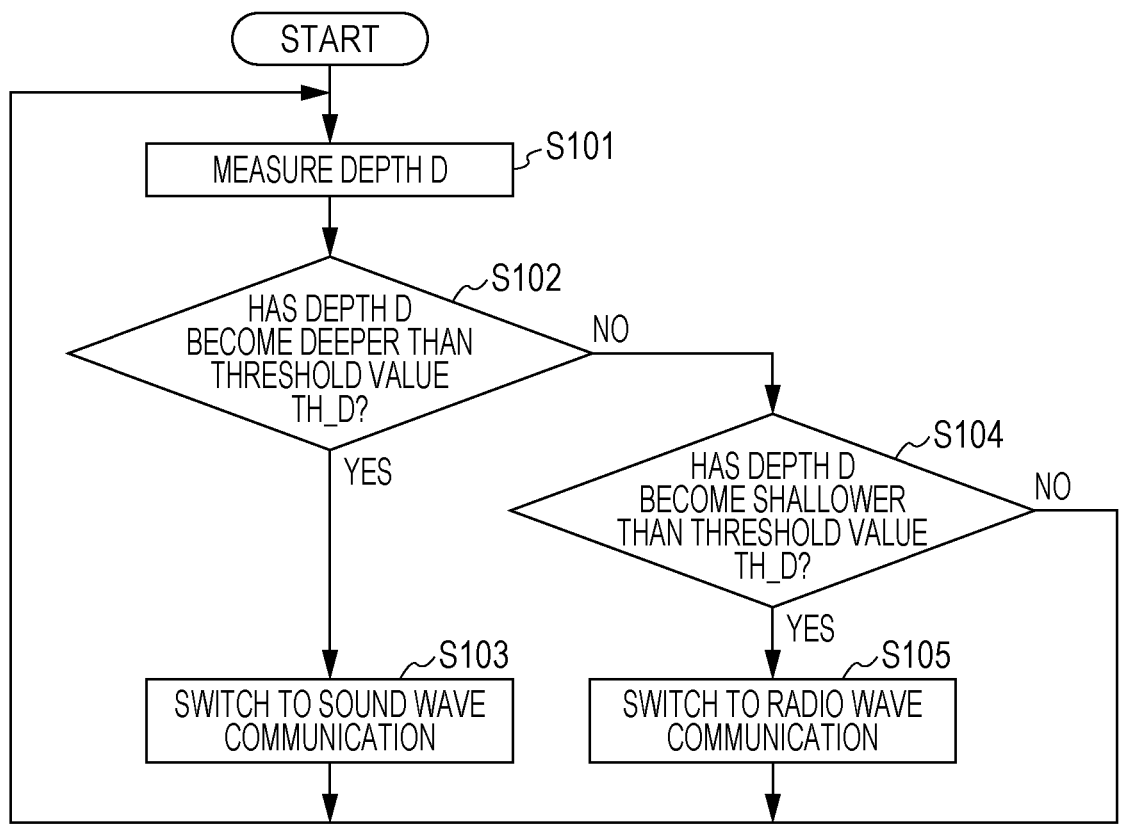
FIG. 4 is a flowchart illustrating an example of processing steps executed by the controller according to the first exemplary embodiment.

Next, the processing steps executed by the underwater drone 1 according to this exemplary embodiment will be described. FIG. 4 is a flowchart illustrating an example of processing steps executed by the controller 10 (the communication controller 102) according to the first exemplary embodiment. The controller 10 repeatedly executes the processing of the flowchart illustrated in FIG. 4. In the case of this exemplary embodiment, the flowchart illustrated in FIG. 4 is executed every time a predetermined time elapses.

First, the communication controller 102 measures the depth D (step 101). In the case of this exemplary embodiment, as the depth D, the value measured by the depth sensor 19 is used as it is.

Next, the communication controller 102 determines whether or not the depth D has become larger than the threshold Th_D (step 102). The determination here is made based on whether or not the relationship of D≤Th_D has changed to the relationship of D>Th_D. For instance, it is determined whether or not the measured depth D is switched from a state of being smaller than 10 m to a state of being larger than 10 m.

When an affirmative result is obtained in step 102, the communication controller 102 switches the communication system from the radio wave communication system (the radio wave communicator 15) to the sound wave communication system (the sound wave communicator 16) (step 103). Although the transmission speed is basically decreased due to the switching to the sound wave communication system, even after a depth D, which does not allow communication by the radio wave communication system, is reached, remote control and transmission of image data are continued. It is to be noted that when communication by the sound wave communication system is selected, decrease in the transmission speed may be reduced by enhancing the image compression rate or increasing the number of communications channels. After the switching here, the flow for the communication controller 102 returns to step 101.

When a negative result is obtained in step 102, the communication controller 102 determines whether or not the depth D has become smaller than the threshold Th_D (step 104). The determination here is made based on whether or not the relationship of D≥Th_D has changed to the relationship of D<Th_D. For instance, it is determined whether or not the measured depth D is switched from a state of being larger than 10 m to a state of being smaller than 10 m.

When an affirmative result is obtained in step 104, the communication controller 102 switches the communication system from the sound wave communication system (the sound wave communicator 16) to the radio wave communication system (the radio wave communicator 15) (step 105). The switching to the radio wave communication system makes the transmission speed higher than the transmission speed in the sound wave communication system. After the switching here, the flow for the communication controller 102 returns to step 101. It is to be noted that when a negative result is obtained in step 104, the communication controller 102 does not switch the communication system, that is, maintains the communication system and the flow returns to step 101.

As described above, the controller 10 of the underwater drone 1 according to this exemplary embodiment is equipped with the radio wave communicator 15 and the sound wave communicator 16, and switching between communication using these two types of communicators is done based on whether or not the depth D of the drone 1 has changed across a predetermined threshold Th_D. Specifically, in an area where the depth is smaller than the threshold Th_D, radio waves are used for communication, and in an area where the depth is larger than the threshold Th_D, sound waves are used for communication. Therefore, the operability of a user is improved compared with the case where only sound waves are used for underwater wireless communication.

For instance, for fishing, inspection of marine facilities or leisure, remote control application of the underwater drone 1 in a shallow water area is assumed. As described above, due to a higher transmission speed of radio waves, the operability of a user is improved compared with the case where the underwater drone 1 is remotely controlled using only sound waves regardless of the depth. Meanwhile, for the purpose of avoiding an underwater obstacle such as a structure or a terrain, or due to the effect of stream of water, the underwater drone 1 may be moved to a deep water area where radio waves do not reach.

However, when the underwater drone 1 is moved to a deep water area, the communication system is switched to the sound wave communication system having a long transmission distance, and thus remote control is continued. For this reason, the operability of a user is not reduced compared with the case where wireless communication is performed using radio waves only. It is to be noted that switching between the communication systems may be performed not only when the transmission distance increases in the depth direction, but also when the transmission distance increases in a horizontal direction. Consequently, the operating range of the underwater drone 1 is increased, and the operability of a user is improved.

Although the determination processing by the communication controller 102 is repeatedly executed at a predetermined execution interval in this exemplary embodiment, when the depth D is close to the threshold Th_D, the execution interval for the determination processing may be reduced. In this case, the execution interval is increased when the depth D is away from the threshold Th_D, and thus the consumption of a battery is reduced. In addition, since the frequency of execution of the determination processing increases in the vicinity of the threshold Th_D where the necessity of switching between the communication systems is high, the timing of changing the depth D across the threshold Th_D approaches the timing of switching between the communication systems.

Although determination as to switching between the communication systems is done at a predetermined time interval in this exemplary embodiment, the execution interval may be changed according to the movement speed in the depth direction, that is, the surfacing speed or the descending speed of the drone 1. For instance, when the movement speed is low, the execution interval may be increased because the change in the depth is small, and when the movement speed is high, the execution interval may be decreased because the change in the depth is large.

Although the communication system is switched after detecting a change of the measured depth D across the threshold Th_D in this exemplary embodiment, the depth D may be simply compared with the threshold Th_D and according to the magnitude relationship, a signal for switching to the radio wave system or the sound wave system may be outputted. Although the case is assumed where the underwater drone 1 communicates with a communication device (not illustrated) that is operated by a user for remote control in this exemplary embodiment, the underwater drone 1 may communicate with a communication device mounted on a ship or a buoy, or may autonomously navigate without communicating with the outside.

Although the same value is used as the threshold Th_D for determination as to switching between the communication systems for both cases where the depth D increases and the depth D decreases in this exemplary embodiment, as in the case of a second embodiment described later, different values may be used for the cases where the depth D increases and the depth D decreases.

Second Exemplary Embodiment

<Configuration of Underwater Drone>

Figure 5:
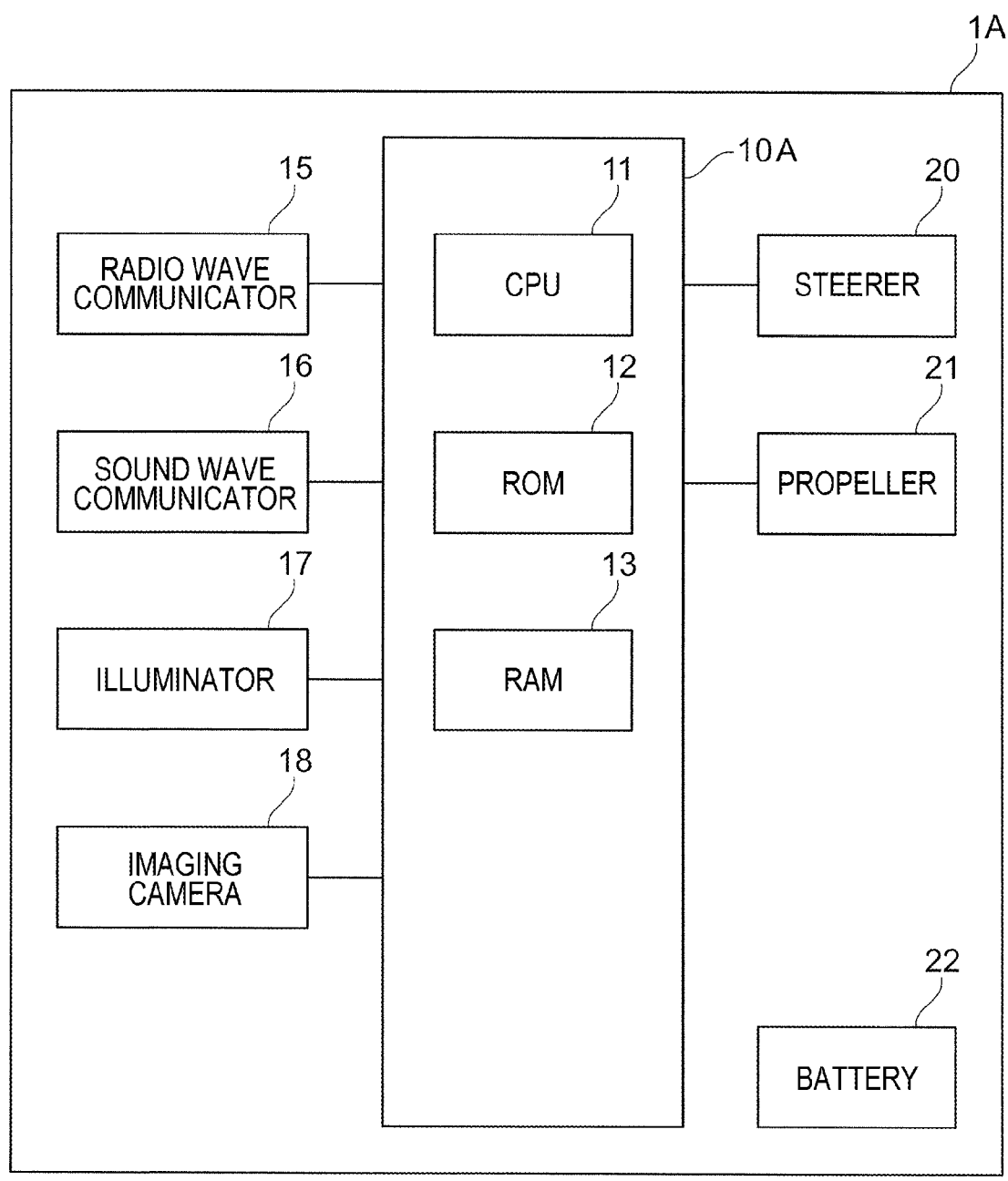
FIG. 5 is a diagram illustrating a configuration example of an underwater drone according to a second exemplary embodiment.

FIG. 5 is a diagram illustrating a configuration example of an underwater drone 1A according to a second exemplary embodiment. The underwater drone 1A according to the second exemplary embodiment does not use information on the depth D for switching between the communication systems, and differs from the above-described underwater drone 1 according to the first exemplary embodiment in that the transmission speed V is used.

In this exemplary embodiment, attention is focused on that the underwater transmission speed V is changed under the effect of the depth D. It is to be noted that the transmission speed V is affected by not only the depth D but also a wave height or transparency (turbidity), and when the wave height is high or when the transparency is low, the transmission speed V is reduced. Thus, in contrast to the case where a fixed threshold Th_D for the depth D is given, in this exemplary embodiment, selection of a communication system based on a change in the communication state is achieved.

As far as switching between communication systems in this exemplary embodiment is concerned, the depth sensor 19 is not required. For this reason, the depth sensor 19 is not mounted on the underwater drone 1A illustrated in FIG. 5. However, the depth sensor 19 may be mounted for a purpose other than switching between communication systems.

<Functional Configuration of Controller>

Figure 6:
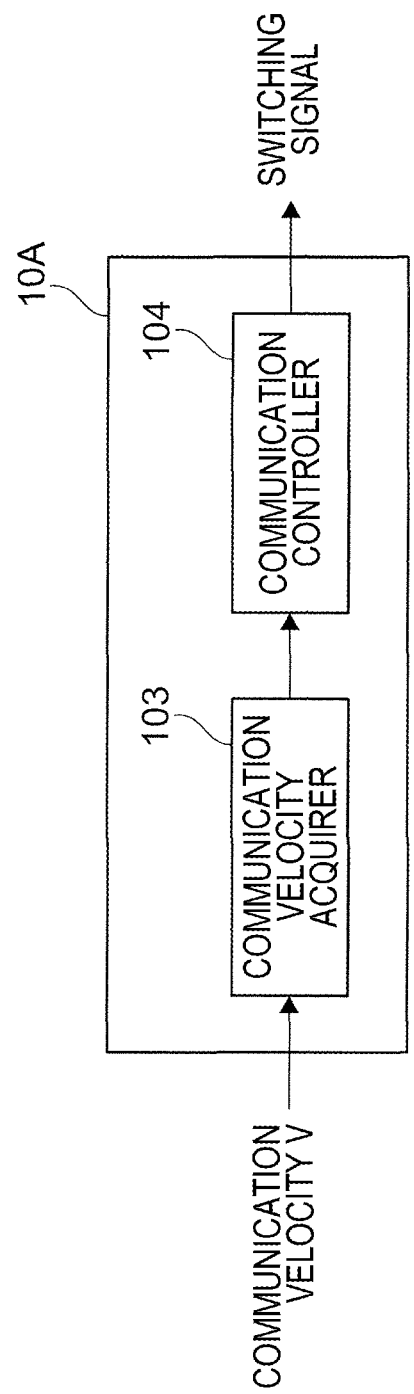
FIG. 6 is a block diagram illustrating an example of a functional configuration of a controller according to the second exemplary embodiment.

Next, the functional configuration of a controller 10A will be described. FIG. 6 is a block diagram illustrating an example of the functional configuration of the controller 10A according to the second exemplary embodiment. The controller 10A has a transmission speed acquirer 103 and a communication controller 104. The transmission speed acquirer 103 is an example of the acquisition unit, and the communication controller 104 is an example of the control unit.

The transmission speed acquirer 103 acquires a transmission speed V based on the amount of data exchanged between a communicator in use (that is, either one of the radio wave communicator 15 and the sound wave communicator 16) and another communication device (mounted on, for instance, a ship or a buoy). The transmission speed V is calculated as the amount of data transmitted per unit of time.

The communication controller 104 compares the acquired transmission speed V with a threshold Th_V, and determines a communication system (specifically, a communicator) used for underwater wireless communication. The value of the threshold Th_V depends on the wavelength and application of radio waves to be used.

Figure 7:
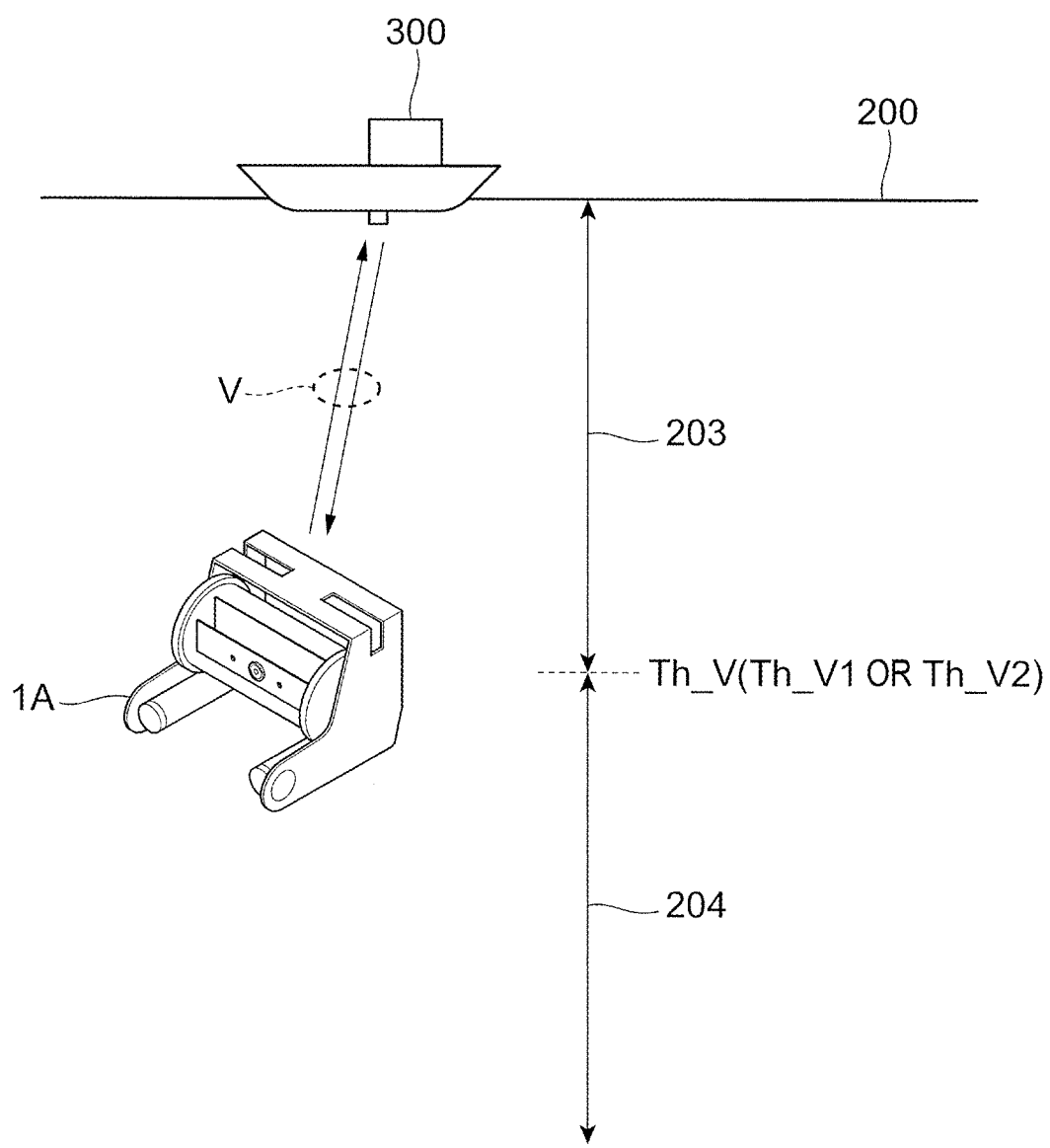
FIG. 7 is an illustration conceptually explaining switching between communication systems performed by a communication controller according to the second exemplary embodiment.

FIG. 7 is an illustration conceptually explaining switching between communication systems performed by the communication controller 104 according to the second exemplary embodiment. FIG. 7 illustrates an example in which another communication device serving as a communication partner is mounted on a ship 300. As described above, the transmission speed V is calculated by the transmission speed acquirer 103. The communication controller 104 compares the transmission speed V with the threshold Th_V, and determines a communication system to be used according to a result of the comparison. In the case of this exemplary embodiment, the communication controller 104 uses an area with the transmission speed higher than the threshold Th_V as a radio wave communication area 203, and uses an area with the transmission speed lower than the threshold Th_V as a sound wave communication area 204. This is because radio waves have a shorter underwater transmission distance and a higher transmission speed compared with sound waves.

In the radio wave communication area 203, use of radio waves with a relatively high transmission speed increases the responsiveness of the underwater drone 1A to a user operation. Therefore, in an area where the depth is small (the radio wave communication area 203), the operability of a user is improved compared with the case where only sound waves are used for underwater wireless communication. In addition, the use of radio waves is also advantageous for achieving real-time transmission of image data captured by the imaging camera 18 because of the high transmission speed.

In contrast, sound waves are used in the sound wave communication area 204, and thus, in spite of a lower transmission speed, remote control of the underwater drone 1A is continued. Although the transmission speed of sound waves is lower than the transmission speed of radio waves, remote control is also continued due to a longer transmission distance of sound waves. It is to be noted that the current image format may be switched to an image format having a higher compression rate at a timing when the communication system is switched to the sound wave system.

The communication controller 104 outputs a switching signal when detecting satisfaction of switching conditions. Specifically, the communication controller 104 outputs a signal to switch the communicator used for communication from the radio wave communicator 15 to the sound wave communicator 16, or a signal to switch the communicator used for communication from the sound wave communicator 16 to the radio wave communicator 15. In FIG. 7, although the communication area is set in the depth direction, switching between the communication systems according to this exemplary embodiment may be used when the transmission distance increases in a horizontal direction, and the transmission speed V changes.

<Processing Steps Executed by Underwater Drone 1A>

Figure 8:
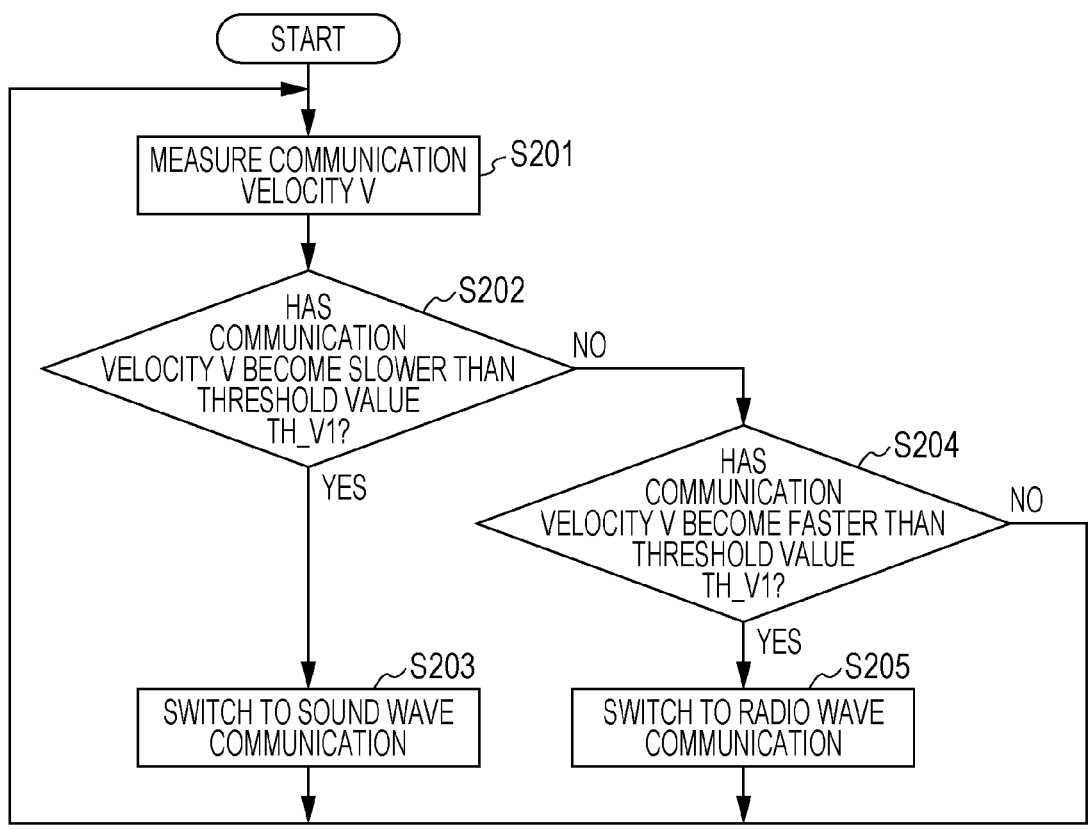
FIG. 8 is a flowchart illustrating an example of processing steps executed by the controller according to the second exemplary embodiment.

Next, the processing steps executed by the underwater drone 1A according to this exemplary embodiment will be described. FIG. 8 is a flowchart illustrating an example of processing steps executed by the controller 10A (the communication controller 104) according to the second exemplary embodiment. The controller 10A repeatedly executes the processing of the flowchart illustrated in FIG. 8. In the case of this exemplary embodiment, the flowchart illustrated in FIG. 8 is executed every time a predetermined time elapses.

First, the communication controller 104 acquires a transmission speed V from the transmission speed acquirer 103 (step 201). Subsequently, the communication controller 104 determines whether or not the transmission speed V has become slower than the threshold Th_V1 (step 202). The determination here is made based on whether or not the relationship of V≥Th_V1 has changed to the relationship of V<Th_V1. The threshold Th_V1 is a threshold that is used when switching from radio waves to sound waves is done, and that is defined based on the transmission speed of radio waves.

When an affirmative result is obtained in step 202, the communication controller 104 switches the communication system from the radio wave communication system (the radio wave communicator 15) to the sound wave communication system (the sound wave communicator 16) (step 203). Although the transmission speed is basically decreased due to the switching to the sound wave communication system, even after a post-change communication state disconnects communication in the radio wave communication system (for instance, even after the depth exceeds the transmission distance of radio waves), remote control and transmission of image data are continued. It is to be noted that in communication by the sound wave communication system, decrease in the transmission speed may be reduced by enhancing the image compression rate or increasing the number of communications channels. After the switching here, the flow for the communication controller 104 returns to step 201.

When a negative result is obtained in step 202, the communication controller 104 determines whether or not the transmission speed V has become higher than the threshold Th_V2 (step 204). The determination here is made based on whether or not the relationship of V≤Th_V2 has changed to the relationship of V>Th_V2. The threshold Th_V2 is a threshold that is used when switching from sound waves to radio waves is done, and that is defined based on the transmission speed of sound waves. It is to be noted that although two types of thresholds Th_V1 and Th_V2 are used in the description here, a common threshold may be used for both cases where switching from radio waves to sound waves is done and switching from sound waves to radio waves is done.

When an affirmative result is obtained in step 204, the communication controller 104 switches the communication system from the sound wave communication system (the sound wave communicator 16) to the radio wave communication system (the radio wave communicator 15) (step 205). In the case of sound waves, the transmission speed V is higher in a shallow water area than in a deep water area. The communication controller 104 detects this change. Switching the communication system to the radio wave communication system makes the transmission speed higher than the transmission speed in the sound wave communication system.

After the switching here, the flow for the communication controller 104 returns to step 201. It is to be noted that when a negative result is obtained in step 204, the communication controller 104 does not switch the communication system, that is, maintains the communication system and the flow returns to step 201.

As described above, the controller 10A of the underwater drone 1A according to this exemplary embodiment is equipped with the radio wave communicator 15 and the sound wave communicator 16, and switching between communication using these two types of communicators is done based on whether or not the transmission speed V measured at the time of determination has changed across a predetermined threshold Th_V (Th_V1 or Th_V2).

Specifically, when the underwater drone 1A is in communication through radio waves, in a water area where the transmission speed V is higher than the threshold Th_V1, communication via radio waves is maintained, and in a water area where the transmission speed V is lower than the threshold Th_V1, sound waves are used for communication. On the other hand, when the underwater drone 1A is in communication through sound waves, in a water area where the transmission speed V is lower than the threshold Th_V2, communication via sound waves is maintained, and in a water area where the transmission speed V is higher than the threshold Th_V2, radio waves are used for communication.

In other words, when the operating water range of the underwater drone 1A is changed to a shallow area, switching to the communication via radio waves with a higher transmission speed is done, and when the operating water range of the underwater drone 1A is changed to a deep area and the transmission speed is reduced, switching to the communication via sound waves with a longer transmission distance is done. Therefore, the operability of a user is improved compared with the case where only sound waves are used for underwater wireless communication.

For instance, for fishing, inspection of marine facilities or leisure, remote control application of the underwater drone 1 in a shallow water area is assumed. As described above, due to a higher transmission speed of radio waves, the operability of a user is improved compared with the case where the underwater drone 1 is remotely controlled using only sound waves regardless of the depth. Meanwhile, for the purpose of avoiding an underwater obstacle such as a structure or a terrain, or due to the effect of stream of water, the underwater drone 1 may be moved to a deep water area where radio waves do not reach.

However, when the underwater drone 1 is moved to a deep water area and the transmission speed V is reduce, the communication system is switched to the sound wave communication system having a long transmission distance, and thus remote control is continued. For this reason, the operability of a user is improved compared with the case where wireless communication is performed using radio waves only. It is to be noted that switching between the communication systems is not limited to when the transmission distance increases in the depth direction. For instance, also when the transmission distance increases in a horizontal direction, switching between the communication systems causes the operating water range of the underwater drone 1 to increase, and thus the operability of a user is improved.

Although the determination processing by the communication controller 102 is repeatedly executed at a predetermined execution interval in the above-described exemplary embodiment, when the transmission speed V is close to the threshold Th_V1 or Th_V2, the execution interval for the determination processing may be reduced. In this case, the execution interval is increased when the transmission speed V is away from the threshold Th_V1 or Th_V2, and the consumption of a battery is reduced. In addition, since the frequency of execution of the determination processing increases in the vicinity of the threshold Th_V1 or Th_V2 where the necessity of switching between the communication systems is high, the timing of changing the transmission speed V across the Th_V1 or Th_V2 approaches the timing of switching between the communication systems.

Although determination as to switching between the communication systems is made at a predetermined time interval in the above-described exemplary embodiment, the execution interval may be changed according to the movement speed in the depth direction, that is, the surfacing speed or the descending speed of the drone 1. For instance, when the movement speed is low, the execution interval may be increased because the change in the depth is small, and when the movement speed is high, the execution interval may be decreased because the change in the depth is large.

Although the communication system is switched after detecting a change of the measured transmission speed V across the threshold Th_V1 or Th_V2 in the above-described exemplary embodiment, the transmission speed V may be simply compared with the threshold Th_V1 or Th_V2 and according to the magnitude relationship, switching to the radio wave system or the sound wave system may be done.

Third Exemplary Embodiment

The underwater drone 1 in the above-described first exemplary embodiment switches between the communication systems when the depth D of the drone 1 is changed across the threshold Th_D. However, in this exemplary embodiment, a new function of placing priority to the transmission speed is added to the communication controller 102. Thus, the underwater drone 1 in this exemplary embodiment uses the underwater drone 1 in the first exemplary embodiment as it is.

Figure 9:
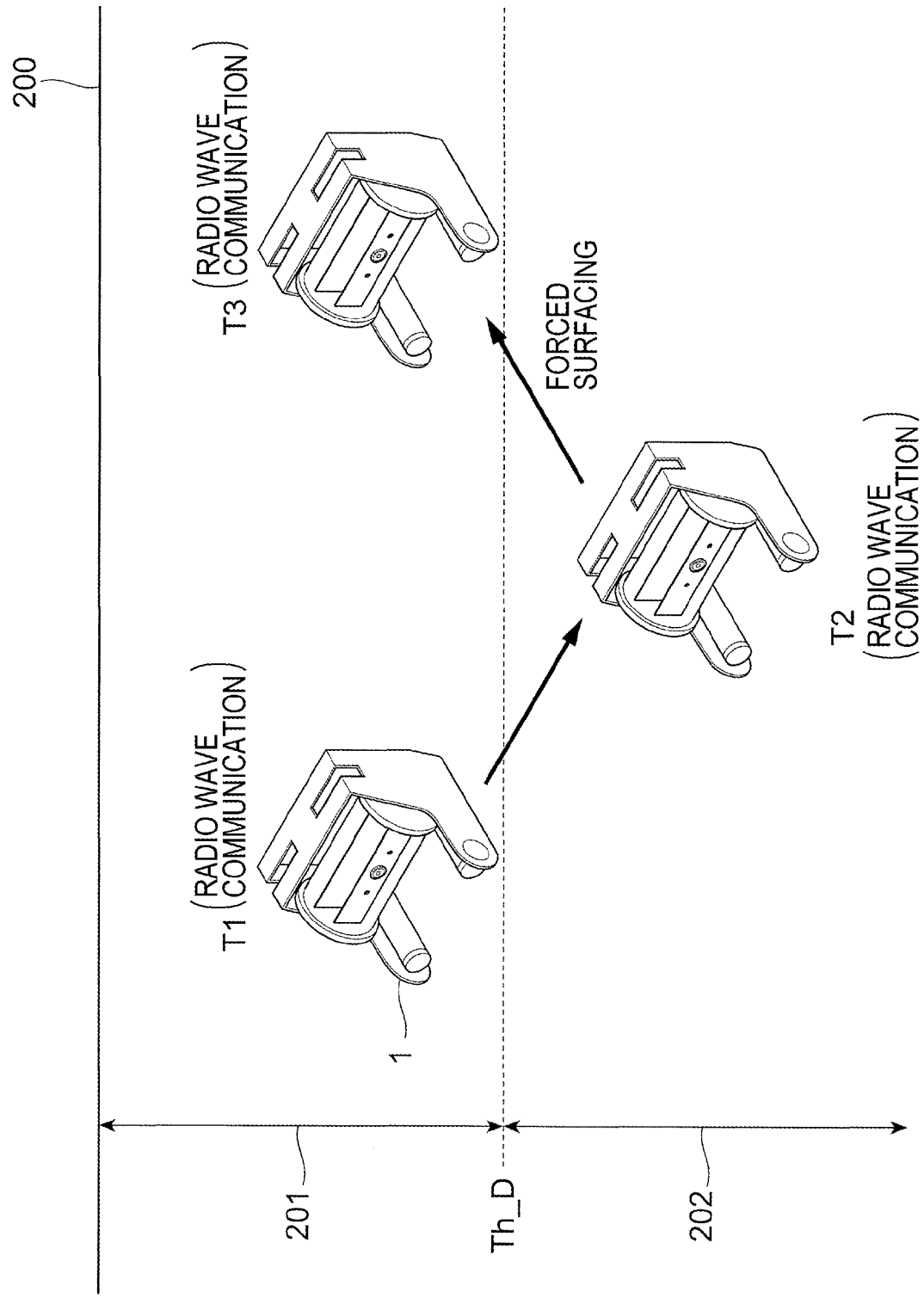
FIG. 9 is an illustration for explaining the concept of control performed by a communication controller according to a third exemplary embodiment.

FIG. 9 is an illustration for explaining the concept of control performed by the communication controller 102 according to the third exemplary embodiment. As seen from FIG. 9, in the case of this exemplary embodiment, even when the underwater drone 1 arrives at an area deeper than the threshold Th_D, the radio wave communication system is maintained as the communication system (from time T1 to time T2).

However, when the depth D continues to descend with the radio wave communication system maintained, communication becomes impossible, and thus the communication controller 102 in this exemplary embodiment controls the steerer 20 controls the steerer 20 to forcedly surface the underwater drone 1 (from time T2 to time T3). Thus, the underwater drone 1 continues to work in an area shallower than the threshold Th_D, and consequently, communication via radio waves with a relatively high transmission speed is maintained. In this exemplary embodiment, the depth sensor 19 functions as an example of the state detection unit.

Figure 10:
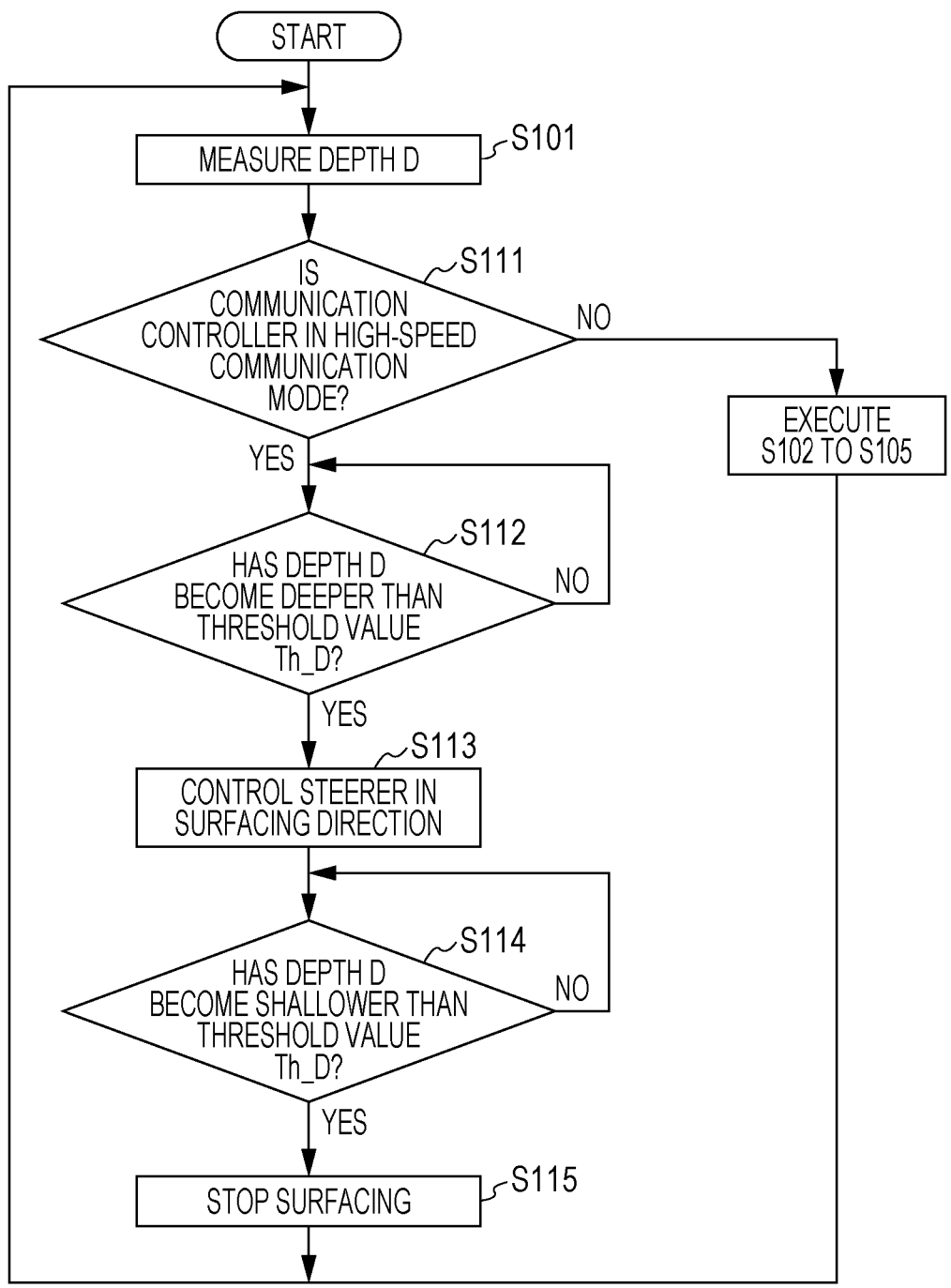
FIG. 10 is a flowchart illustrating an example of processing steps executed by the communication controller according to the third exemplary embodiment.

Next, the processing steps executed by the underwater drone 1 according to this exemplary embodiment will be described. FIG. 10 is a flowchart illustrating an example of processing steps executed by the communication controller 102 according to the third exemplary embodiment. In the case of this exemplary embodiment, after the measurement (step 101) of the depth D, the communication controller 102 determines whether or not the current mode is a high-speed communication mode (step 111). The high-speed communication mode is a communication mode that places priority to the communication via radio waves with a transmission speed higher than the transmission speed of sound waves, and a user specifies the high-speed communication mode in advance.

The operation to be performed when a negative result is obtained in step 111 is the same as what has been described in the first exemplary embodiment. When an affirmative result is obtained in step 111, the communication controller 102 determines whether or not the depth D has become larger than the threshold Th_D (step 112). In other words, as in the first exemplary embodiment, it is determined whether or not a phenomenon, which triggers switching of the communication system to the sound wave communication system, has occurred. As long as a negative result is obtained in step 112, communication via radio waves is continued, and the communication controller 102 repeats the determination processing.

When an affirmative result is obtained in step 112, the communication controller 102 controls the steerer 20 in the surfacing direction (step 113). Thus, the underwater drone 1 is controlled and forcedly moved in a direction in which the depth D decreases. Since the control is performed when the depth D is detected to be larger than the threshold Th_D, communication via radio waves is not interrupted.

Next, the communication controller 102 determines whether or not the depth D has become smaller than the threshold Th_D (step 114). In the determination, whether or not the depth has returned to a depth in the radio wave communication area 201 is determined. As long as a negative result is obtained in step 114, surfacing of the underwater drone 1 has to be continued, and the communication controller 102 repeats the determination processing.

When an affirmative result is obtained in step 114, the communication controller 102 controls the steerer 20 to stop the surfacing (step 115). This is because the underwater drone 1 has returned to the radio wave communication area 201 where the transmission speed is high. It is to be noted that since the control is autonomously performed in consideration of the transmission speed, the subsequent control is again remote control by a user.

In this exemplary embodiment, as described above, the underwater drone 1 is assumed to be equipped with the radio wave communicator 15 and the sound wave communicator 16 as the communicators. However, the invention is applicable to an underwater drone equipped with only one communicator. This is because communication in the radio wave communication area 201 is continued without switching between communication systems.

Fourth Exemplary Embodiment

The underwater drone 1A in the above-described second exemplary embodiment switches between the communication systems when the transmission speed V has changed across the threshold Th_V1 or Th_V2. However, in this exemplary embodiment, a new function of placing priority to the transmission speed is added to the communication controller 104. Thus, the underwater drone 1A in this exemplary embodiment uses the underwater drone 1A in the second exemplary embodiment as it is. In this exemplary embodiment, the transmission speed acquirer 103 functions as an example of the state detection unit.

Figure 11:
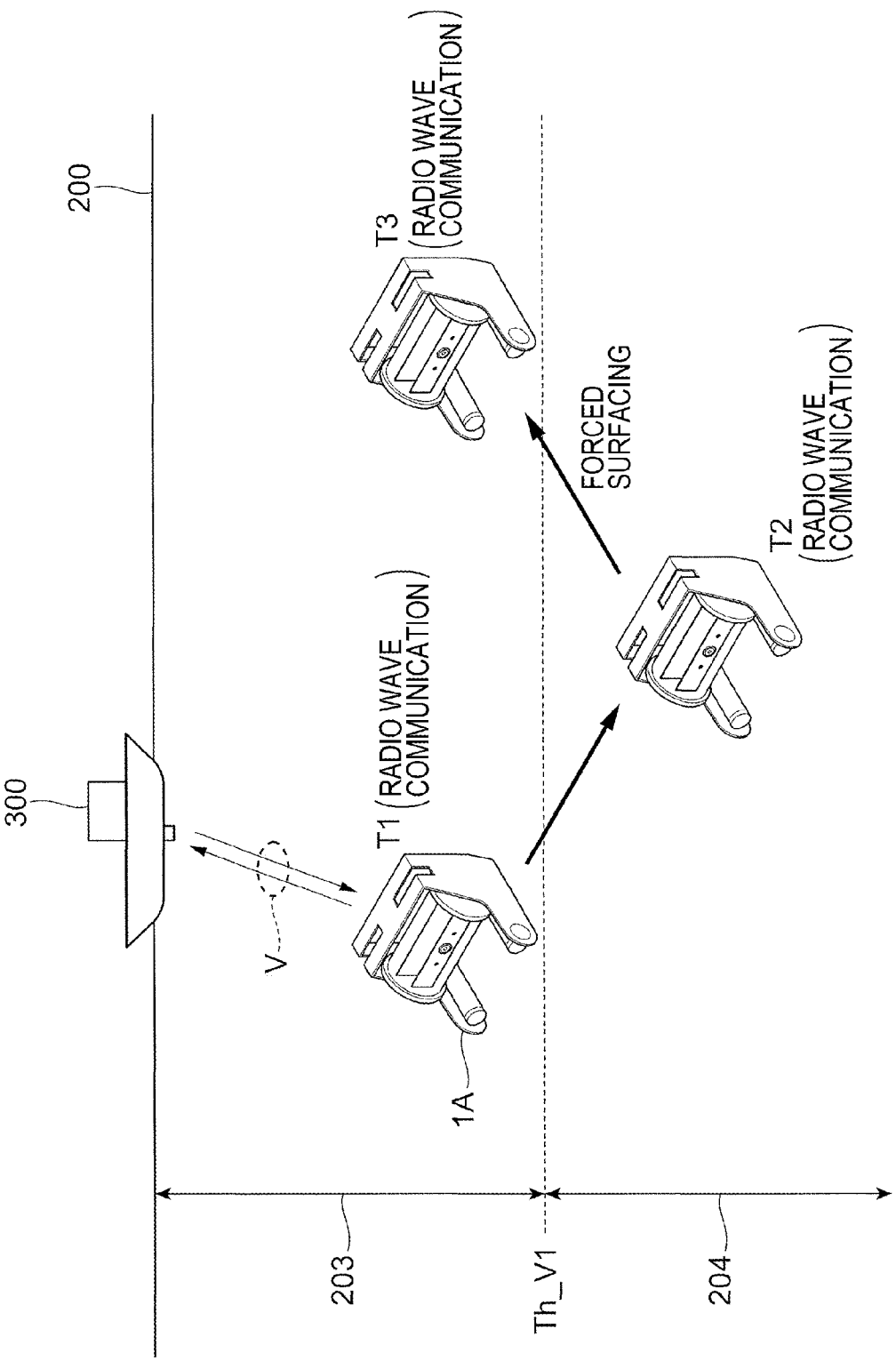
FIG. 11 is an illustration for explaining the concept of control performed by a communication controller according to a fourth exemplary embodiment.

FIG. 11 is an illustration for explaining the concept of control performed by the communication controller 104 according to the fourth exemplary embodiment. As seen from FIG. 11, in the case of this exemplary embodiment, even when the underwater drone 1A arrives at a depth of water where the transmission speed V of the underwater drone 1A is lower than the threshold Th_V1, the radio wave communication system is maintained as the communication system (from time T1 to time T2).

However, when the depth D continues to descend with the radio wave communication system maintained, communication becomes impossible, and thus the communication controller 104 in this exemplary embodiment controls the steerer 20 controls the steerer 20 to forcedly surface the underwater drone 1A (from time T2 to time T3). Thus, the underwater drone 1A continues to work in an area where the transmission speed V is lower than the threshold Th_V1, and consequently, communication via radio waves with a relatively high transmission speed is maintained.

Figure 12:
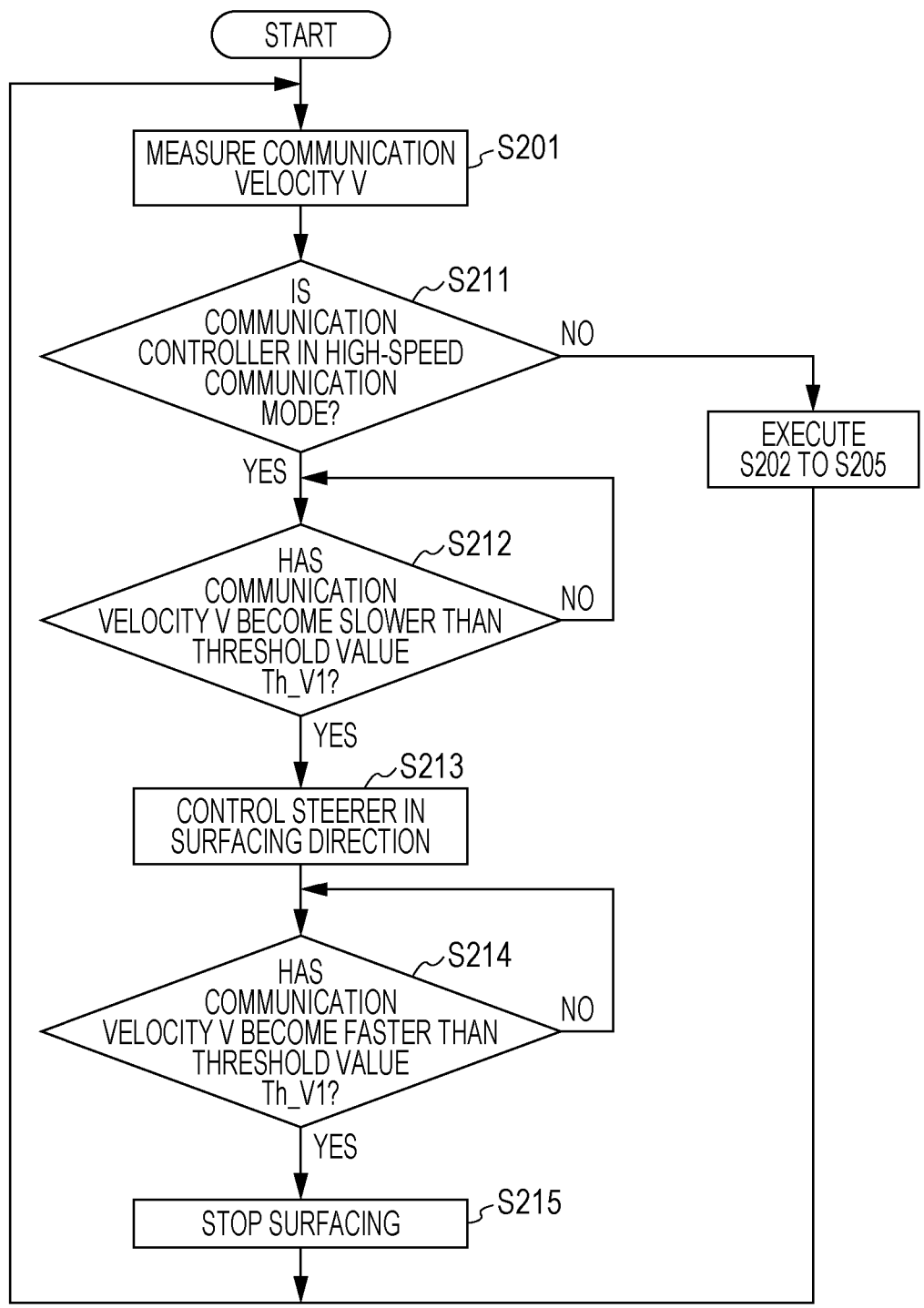
FIG. 12 is a flowchart illustrating an example of processing steps executed by the communication controller according to the fourth exemplary embodiment.

Next, the processing steps executed by the underwater drone 1A according to this exemplary embodiment will be described. FIG. 12 is a flowchart illustrating an example of processing steps executed by the communication controller 104 according to the fourth exemplary embodiment. In the case of this exemplary embodiment, after the measurement (step 201) of the transmission speed V, the communication controller 104 determines whether or not the current mode is a high-speed communication mode (step 211).

The operation to be performed when a negative result is obtained in step 211 is the same as what has been described in the second exemplary embodiment. When an affirmative result is obtained in step 211, the communication controller 104 determines whether or not the transmission speed V has become slower than the threshold Th_V1 (step 212). In other words, as in the second exemplary embodiment, it is determined whether or not a phenomenon, which triggers switching of the communication system to the sound wave communication system, has occurred. As long as a negative result is obtained in step 212, communication via radio waves is continued, and the communication controller 104 repeats the determination processing.

When an affirmative result is obtained in step 212, the communication controller 104 controls the steerer 20 in the surfacing direction (step 213). Thus, the underwater drone 1A is controlled and forcedly moved in a direction in which the depth D decreases. Since the control is performed when the transmission speed V is detected to be lower than the threshold Th_V1, communication via radio waves is not interrupted.

Next, the communication controller 104 determines whether or not the transmission speed V has become higher than threshold Th_V2 (step 214). In the determination, whether or not the underwater drone 1A has returned to the radio wave communication area 203 is determined. As long as a negative result is obtained in step 214, surfacing of the underwater drone 1A has to be continued, and the communication controller 104 repeats the determination processing.

When an affirmative result is obtained in step 214, the communication controller 104 controls the steerer 20 to stop the surfacing (step 215). This is because the underwater drone 1A has returned to the radio wave communication area 201 where the transmission speed is high. It is to be noted that since the control is autonomously performed in consideration of the transmission speed, the subsequent control is again remote control by a user.

In this exemplary embodiment, as described above, the underwater drone 1A is assumed to be equipped with the radio wave communicator 15 and the sound wave communicator 16 as the communicators. However, the invention is applicable to an underwater drone equipped with only one communicator. This is because communication in the radio wave communication area 201 may be continued without switching between communication systems.

Fifth Exemplary Embodiment

Figure 13:
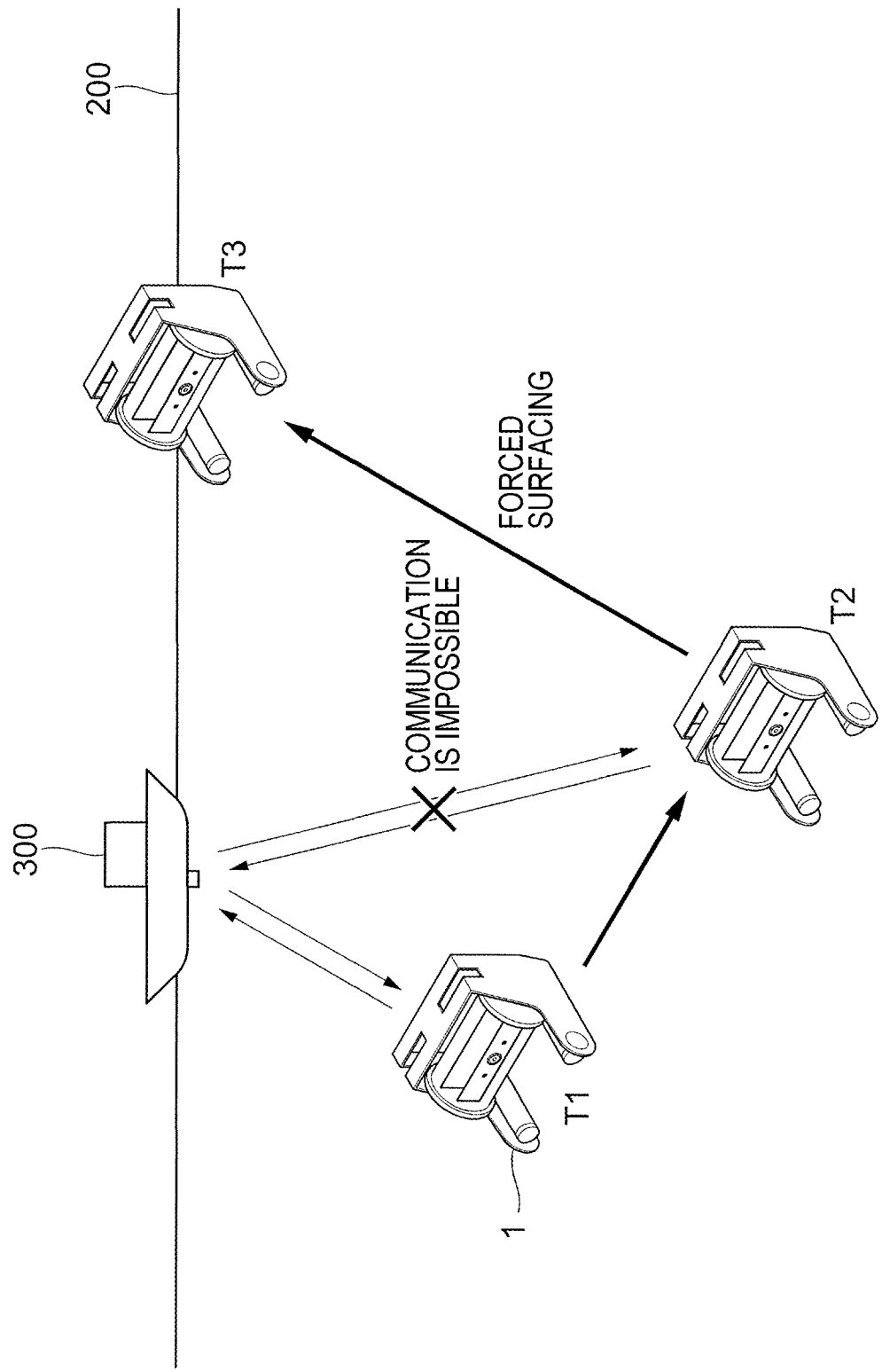
FIG. 13 is a conceptual illustration of control operations in a fifth exemplary embodiment.

In this exemplary embodiment, a function to be used in combination with the above-described first to fourth exemplary embodiments will be described. FIG. 13 is a conceptual illustration of control operations in a fifth exemplary embodiment. In the case of this exemplary embodiment, when communication is impossible with any of the radio wave communicator 15 and the sound wave communicator 16, the communication controller 102 or 104 performs control to move the underwater drone 1A to a predetermined position and to attempt to establish communication by the radio wave communicator 15 and the sound wave communicator 16.

FIG. 13 illustrates a water surface as an example of the predetermined position. The predetermined position may be on a water surface or in water as long as the position is for re-establishing communication. The movement here may be movement in a horizontal direction, or movement in the surfacing direction or the descending direction. For instance, when a communication device as a communication destination is installed at the bottom of water or at a position deeper than the underwater drone, the underwater drone may be moved in the descending direction for the purpose of reducing the communication distance to the underwater drone. The predetermined position is not necessarily one position.

Figure 14:
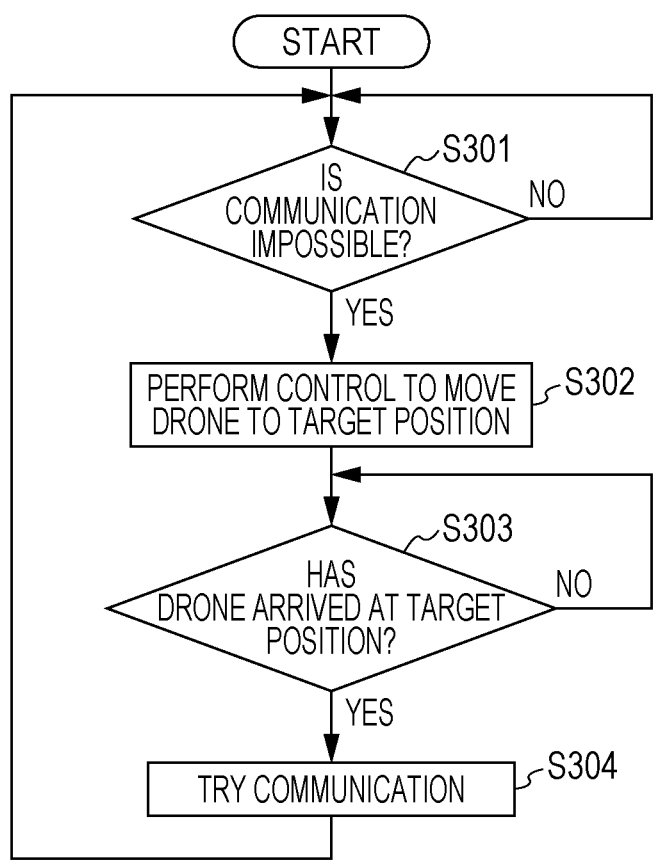
FIG. 14 is a flowchart illustrating an example of processing steps executed by the communication controller according to the fifth exemplary embodiment.

Next, an example of the detail of the control performed by the communication controller 102 or 104 will be described. FIG. 14 is a flowchart illustrating an example of processing steps executed by the communication controller according to the fifth exemplary embodiment. Hereinafter, the communication controller 102 will be described as an example. The communication controller 102 executes the processing illustrated in FIG. 14 in parallel with the above-described switching control for communication system.

First, it is determined whether or not communication is impossible with any of the radio the wave communicator 15 and the sound wave communicator 16 (step 301). As long as a negative result is obtained in step 301, the communication controller 102 executes the operation which has been explained in one of the exemplary embodiments described above. When an affirmative result is obtained in step 301, the communication controller 102 controls the steerer 20 and the propeller 21 to move the underwater drone 1 to a predetermined position (step 302). For the movement, various sensors mounted on the underwater drone 1 and information on movement path, and position information from a position detection system are used.

The movement operation in step 302 is continued until arrival to a predetermined position is checked (until an affirmative result is obtained) in step 303. When an affirmative result is obtained in step 303, the communication controller 102 stops the movement and attempts to establish communication by the communicator (either one of the radio wave communicator 15 and the sound wave communicator 16 in this exemplary embodiment) (step 304). In other words, even when communication becomes impossible due to a sudden change in the underwater environment or the like, in this exemplary embodiment, the communication controller 102 moves the underwater drone 1 to a predetermined position and attempts to establish communication by the communicator. After step 304, the flow for the communication controller 102 returns to step 301, and when communication is resumed, the underwater drone 1 returns to remote control.

It is to be noted that in this exemplary embodiment, the underwater drone 1A is assumed to be equipped with the radio wave communicator 15 and the sound wave communicator 16 as the communicators. However, the movement to a predetermined position and a function of trying communication in the case of impossible communication may applied to an underwater drone equipped with only one communicator.

Sixth Exemplary Embodiment

Figure 15:
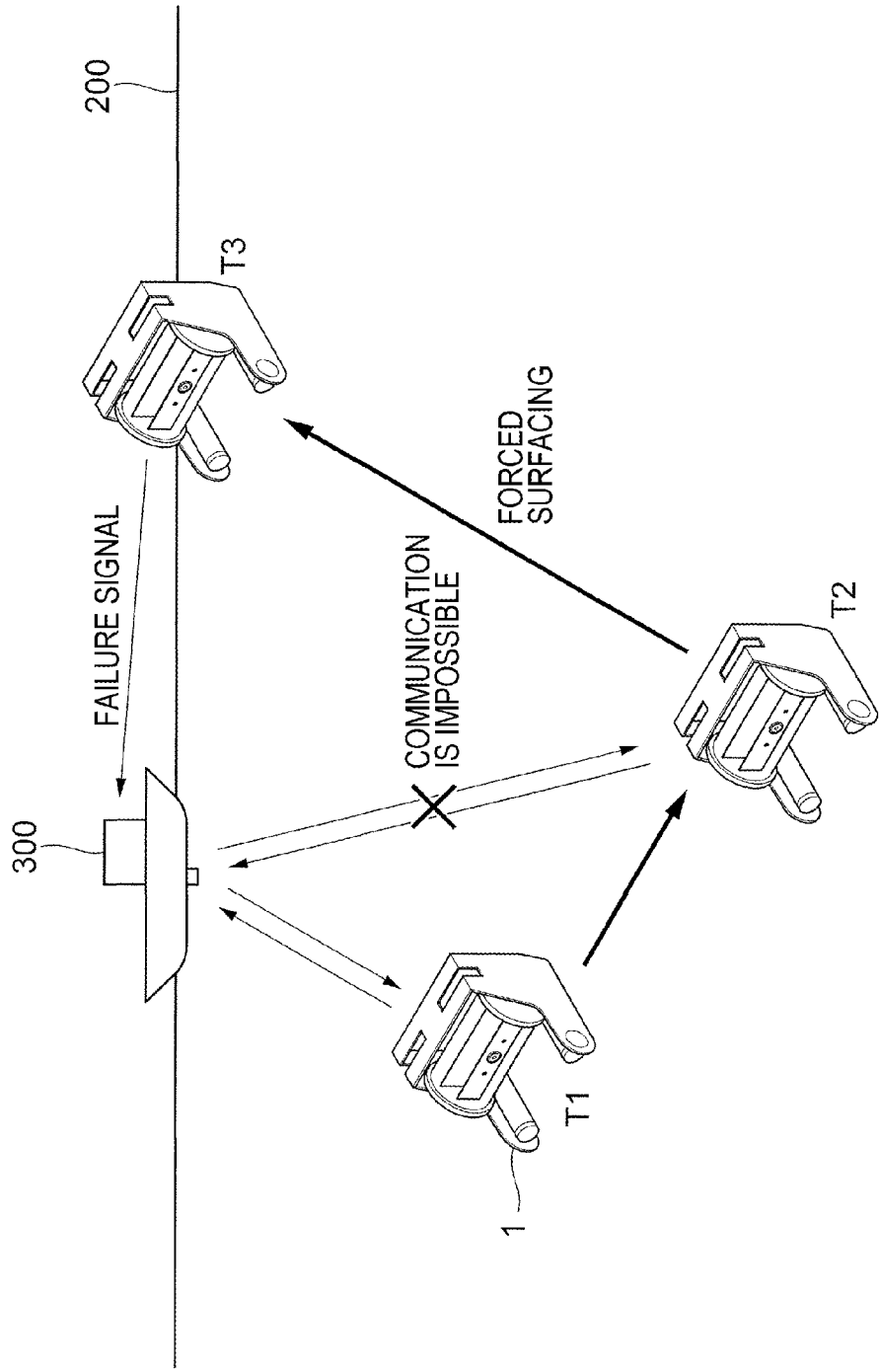
FIG. 15 is a conceptual illustration of control operations in a sixth exemplary embodiment.

In this exemplary embodiment, a function provided in case communication is not resumed in the above-described fifth exemplary embodiment will be explained. FIG. 15 is a conceptual illustration of control operations in a sixth exemplary embodiment. In the case where impossible communication is caused by the communicator, even when the underwater drone 1 is moved to a predetermined position, communication is not recoverable as described above.

Thus, in this exemplary embodiment, a failure signal transmitter (not illustrated) is mounted on the underwater drone 1, and when communication is impossible even after the underwater drone 1 is moved to a predetermined position, a failure signal is transmitted. The failure signal is a one-way signal that is transmitted from the underwater drone 1, for instance, a beacon.

Figure 16:
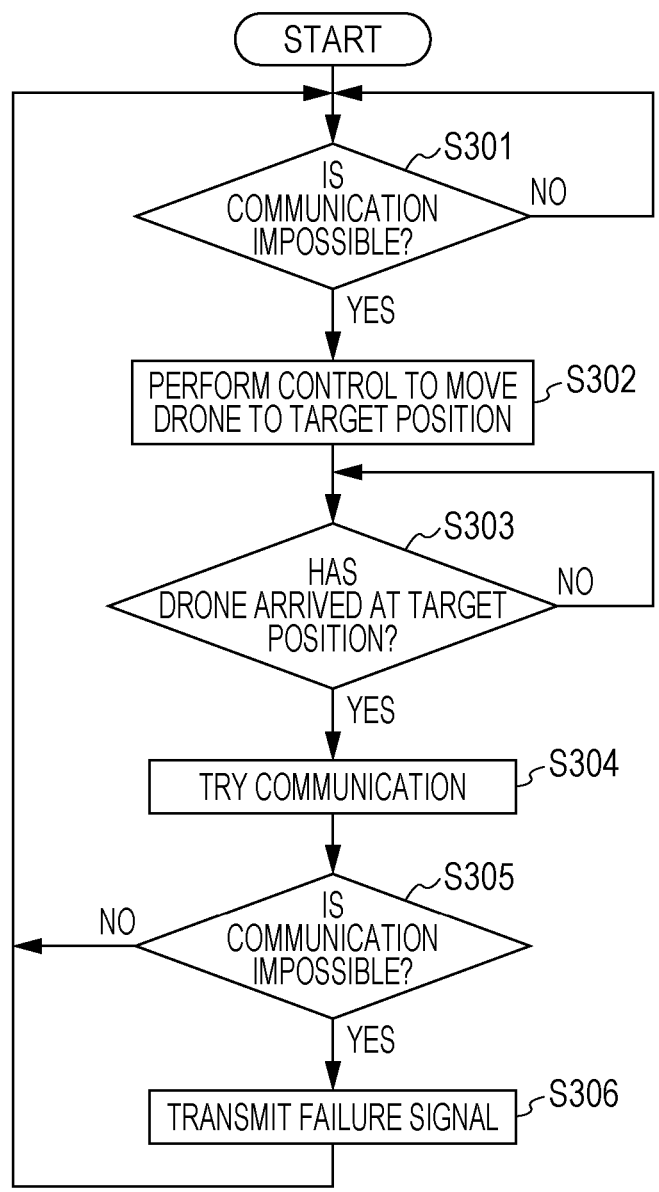
FIG. 16 is a flowchart illustrating an example of processing steps executed by the communication controller according to the sixth exemplary embodiment.

FIG. 16 is a flowchart illustrating an example of processing steps executed by the communication controller according to the sixth exemplary embodiment. After execution of the processing (FIG. 14) from step 301 to step 304, the communication controller 102 determines whether or not communication is impossible after a trial of communication (step 305). When a negative result is obtained in step 305, communication is resumed, and thus the flow for the communication controller 102 returns to step 301. On the other hand, when an affirmative result is obtained in step 305, the communication controller 102 commands a failure signal transmitter (not illustrated) to transmit a failure signal (step 306). Although the flow returns to step 301 after transmission of a failure signal in this exemplary embodiment, transmission of a failure signal may be continued.

In this exemplary embodiment, as described above, the underwater drone 1 is assumed to be equipped with the radio wave communicator 15 and the sound wave communicator 16 as the communicators. However, the invention is applicable to an underwater drone equipped with only one communicator.

Other Exemplary Embodiments

In the above-described exemplary embodiments, the underwater drone 1 or 1A equipped with the radio wave communicator 15 and the sound wave communicator 16 has been explained. However, the communicator mounted on the underwater drone 1 or 1A is not limit to these. For instance, an optical communicator that uses light for communication may be used. The optical communicator is configured by a light emitter and a light receiver, and for instance, visible light is used. As the light emitter, for instance, an LED, which emits blue light absorbed less underwater, is used.

In consideration of optical communicators, there are three combinations of communicators: a combination of the radio wave communicator and the optical communicator, a combination of the sound wave communicator and the optical communicator, and a combination of the radio wave communicator, the sound wave communicator, and the optical communicator. A threshold used for switching between communication systems is set for each of the combinations. A threshold used for a combination of or switching between communicators may be determined comprehensively from the viewpoint of the application, the communication distance, the transmission speed, and the environment, for instance. Switching between multiple types of communication systems based on the depth or information varying with the depth causes the operability of a user to be improved compared with the case where wireless communication is performed only using a single communication system.

Although the illuminator 17 and the imaging camera 18 are mounted on the underwater drone 1 or 1A according to the above-described exemplary embodiments, these components may not be mounted. The underwater drone according to the above-described exemplary embodiments may include, for instance, a robot arm, a fixing tool, or equipment needed depending on the application.

Although a depth measured by the depth sensor 19 is used for switching between the communication systems in the above-described exemplary embodiments, a water pressure measured by a pressure gauge or a water temperature measured by a temperature gauge may be outputted to the controller 10. When a value indicating the ambient environment or the usage environment is used, the control unit 10 compares a water pressure instead of a depth with a threshold to switch between the communication systems, or compares a water temperature instead of a depth with a threshold to switch between the communication systems. It is sufficient that each threshold be set to a value that achieves the switching as in the case where a depth is used.

Although a transmission speed is measured in the above-described exemplary embodiments, a communication situation may be checked using the intensity of a signal received and switching between the communication systems may be done. This is because the transmission speed is affected by the intensity of communication. Although the imaging camera 18 is mounted on the underwater drone 1 in the above-described exemplary embodiments, an underwater microphone may be mounted along with the imaging camera 18 or instead of the imaging camera 18. When an imaging camera is not used, the illuminator 17 does not have to be mounted.

Although each one of the radio wave communicator 15 and the sound wave communicator 16 is disposed as the communicator in the above-described exemplary embodiments, multiple units of each communicator may be disposed. Multiple units of a communicator may be prepared for one communication system so that an alternative communicator may be used as a replacement for a failed communicator, or multiple units of a communicator may be used to increase the amount of communication per unit time.

Although the underwater wireless communication in the underwater drone as an unmanned underwater mobile body has been described as an example in the above-described exemplary embodiments, the invention is applicable to underwater wireless communication in a manned underwater mobile body, for instance, a mobile body to be boarded by one to three crews.

Although the case where the underwater drone changes the moving direction by the steerer has been explained in the above-described exemplary embodiments, in the case of a robot for underwater work, the moving direction may be changed by a caterpillar or another drive unit.

Although the exemplary embodiments of the invention have been described so far, the technical scope of the invention is not limited to the range described in the exemplary embodiments. It is apparent from the description of the claims that embodiments obtained by making various modifications or improvements to the exemplary embodiments are also included in the technical scope of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An underwater mobile body comprising:
    a communication unit that has a plurality of communicators adopting different communication systems and that performs underwater wireless communication with another device using one of the plurality of communicators;
    an acquisition unit that acquires information on depth or information varying with depth; and
    a control unit that controls the communication unit to switch, between the plurality of communicators and based on the acquired information, the one communicator used for underwater wireless communication.

2. The underwater mobile body according to claim 1, wherein when communication is not possible with any of the plurality of communicators, the control unit moves the underwater mobile body to a predetermined position and attempts to establish communication.

3. The underwater mobile body according to claim 2, wherein when communication is not possible with the plurality of communicators even after the movement to the predetermined position, the control unit causes a failure signal transmitter to transmit a failure signal.

4. The underwater mobile body according to claim 1, wherein the control unit selects a communicator having a faster communication speed from the plurality of communicators in a case where the depth is smaller.

5. The underwater mobile body according to claim 4, wherein in an area where the depth is small, the control unit selects a communicator that uses radio waves from the plurality of communicators, and in an area where the depth is large, the control unit selects a communicator that uses sound waves from the plurality of communicators.

6. An underwater mobile body comprising:
a communication unit that has a plurality of communicators adopting different communication systems and that performs underwater wireless communication with another device using one of the plurality of communicators; and
a control unit that, when depth is changed, controls the communication unit to switch the one communicator to another one of the plurality of communicators.

7. An underwater mobile body comprising:
a communication unit that performs underwater wireless communication with another device; and
a state detection unit that detects a state of the underwater wireless communication performed by the communication unit,
wherein depth is changed according to a result of the detection by the state detection unit.

* * * * *